Figure 1:
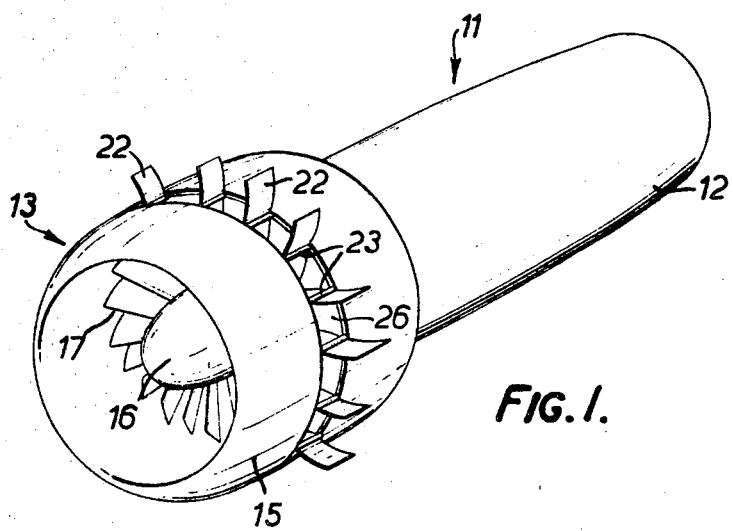

United States Patent [19]
Davis

[11] 3,747,341
[45] July 24, 1973

[54] FANS
[75] Inventor: David George Michael Davis, Cheltenham, England
[73] Assignee: Dowty Rotol Limited, Gloucester, England
[22] Filed: Dec. 17, 1971
[21] Appl. No.: 209,196

[30] Foreign Application Priority Data
Jan. 2, 1971 Great Britain.................... 272/71

[52] U.S. Cl............ 60/226 A, 239/265.31, 415/145
[51] Int. Cl.......................... F02k 3/02, F02b 25/02
[58] Field of Search...................... 415/145, 144, 79; 416/157; 239/265.31; 60/226 A, 226

[56] References Cited
UNITED STATES PATENTS
3,009,318  11/1961  Skoff.................................... 415/79
3,476,486  11/1969  Davies et al. ...................... 415/145
3,500,646  3/1970  Hom et al. ........................ 60/226 A
3,620,022  11/1971  Beale ............................... 60/226 A Primary Examiner—Henry F. Raduazo
Attorney—Irvin S. Thompson et al.

[57] ABSTRACT

A fan assembly for a gas turbine engine of the ducted-fan by-pass type includes a non-rotative by-pass duct and a single-stage fan mounted for rotation by the engine within the by-pass duct. The fan has flow-varying blading capable of movement from positive pitch into negative pitch whereby the direction of flow of air in the duct is reversed. The duct has means located downstream with respect to the fan blading when in positive pitch and operative when the fan blading is in negative pitch to increase the amount of air introduced to the duct.

15 Claims, 12 Drawing Figures

PATENTED JUL 24 1973

3,747,341

SHEET 1 OF 4

PATENTED JUL 24 1973

3,747,341

SHEET 3 OF 4

FANS

This invention relates to fans for use in gas turbine engines of the ducted-fan by-pass type, and to gas turbine engines of that type.

According to one aspect of the invention a fan assembly for a gas turbine engine of the ducted-fan by-pass type includes a non-rotative by-pass duct and a single-stage fan mounted for rotation by the engine within the by-pass duct, said fan having flow-varying blading capable of movement from positive pitch into negative pitch whereby the direction of flow of air in the duct is reversed, and said duct having means located downstream with respect to the fan blading when in positive pitch and operative when the fan blading is in negative pitch to increase the amount of air introduced to the duct.

The said means may comprise flap valves pivotally mounted in the wall of the duct and openable automatically, when the fan blading is adjusted to negative pitch, by consequent suction created in the duct. Opening of the flap valves affords entry of air from the exterior of the duct to the interior thereof which supplements air entering the duct through an annular entry formed between the rearward end portion of the duct and the engine assembly.

Ports may be provided in the wall of the duct with which the flap valves are co-operable, said ports being arranged in alignment peripherally of the duct. The axes about which the flap valves are pivotable may be parallel to the rotational axis of the fan, or, alternatively, they may be arranged tranversely with respect to that axis.

Alternatively, said means may comprise a rearward portion of the duct which is axially displaceable rearwardly with respect to a main portion thereof by operating means to produce an annular auxiliary intake in the wall of the duct. This intake affords entry of air from the exterior of the duct to the interior thereof which supplements the air already entering the duct through the annular entry formed between the rearward end portion of the duct and the engine assembly.

The operating means may comprise fluid-pressure-operable jacks carries within the structure of the main portion of the duct, with their axes parallel to the rotational axis of the fan, and directly connected between said main portion and said rearward portion of the duct.

Alternatively again, the said means may comprise two intermediary annular portions of the duct which are ported and which are relatively rotatable about the rotational axis of the fan by operating means, the ports when in registry, those of one of said portions with respect to those of the other of said portions, producing a series of peripherally spaced intake openings through the wall of the duct. These openings afford entry of air from the exterior of the duct to the interior thereof which supplements the air already entering the duct through the annular entry formed between the rearward end portion of the duct and the engine assembly.

In this case said operating means may comprise fluid-pressure-operable jacks carried within the structure of the duct, with their axes parallel to the rotational axis of the fan, and connected between that structure and helical drive means in one of said two intermediary annular portions, said helical drive means converting linear movement of the jacks into rotary movement of said one portion with respect to the other portion.

Again, said means may comprise a series of peripherally arranged gill-like members pivotally mounted upon the rearward end. portion of said duct and capable, as or when the fan blading is moved into negative pitch, of being moved outwardly about their pivots so as collectively to provide a flared entry for the rearward end portion of the duct.

The gill-like members may be operated by fluid-pressure-operable jacks housed within the duct structure.

Also according to this invention a fan assembly, for attachment to the front of a main gas turbine engine assembly to provide an engine of the ducted-fan by-pass type, is constructed as a unitary assembly which can be fitted and removed as such and comprises a non-rotative portion, which includes a by-pass duct, and a rotative sub-assembly comprising a single-stage fan supported in bearings by the non-rotative portion, said fan having flow-varying blading surrounded by said by-pass duct and capable of movement from positive pitch into negative pitch whereby the direction of flow of air in the duct is reversed, and said duct having means located downstream with respect to the fan blading when in positive pitch and operative when the fan blading is in negative pitch to increase the amount of air introduced to the duct.

According to another aspect of the invention a gas turbine engine of the ducted-fan by-pass type has a front-mounted fan assembly which includes a single-stage fan and a non-rotative duct within which the fan is rotatable, said fan having flow-varying blading capable of movement from positive pitch into negative pitch whereby the direction of flow of air in the duct is reversed, and said duct having means located downstream with respect to the fan blading when in positive pitch and operative when the fan blading is in negative pitch to increase the amount of air introduced to the duct.

Also according to the invention a gas turbine engine of the ducted-fan by-pass type has a front-mounted fan assembly which is detachable from the remainder of the engine as a complete assembly and which comprises a rotative sub-assembly in the form of a single-stage fan including a hub and flow-varying blading, and a non-rotative portion by which the complete assembly is mounted and which includes a stationary duct which surrounds said flow-varying blading, said flow-varying blading being capable of movement from positive pitch into negative pitch whereby the direction of flow of air in the duct is reversed, and said duct having means located downstream with respect to the fan blading when in positive pitch and operative when the fan blading is in negative pitch to increase the amount of air introduced to the duct.

Figure 2:
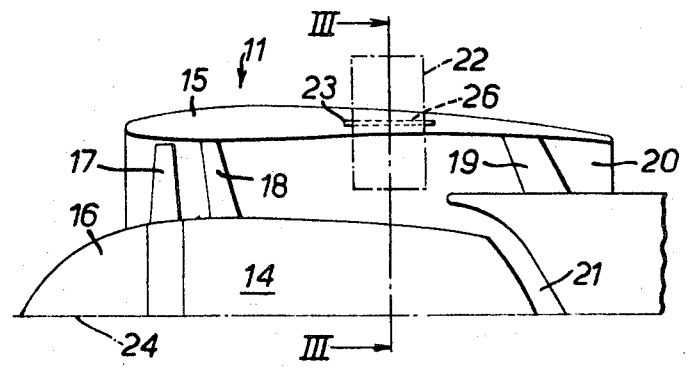
Figure 3:
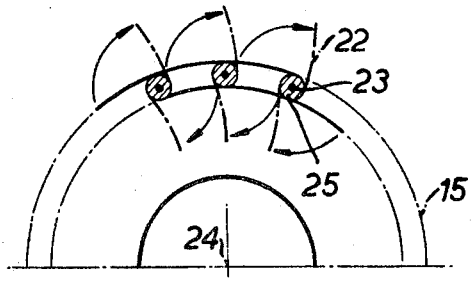
Figure 4:
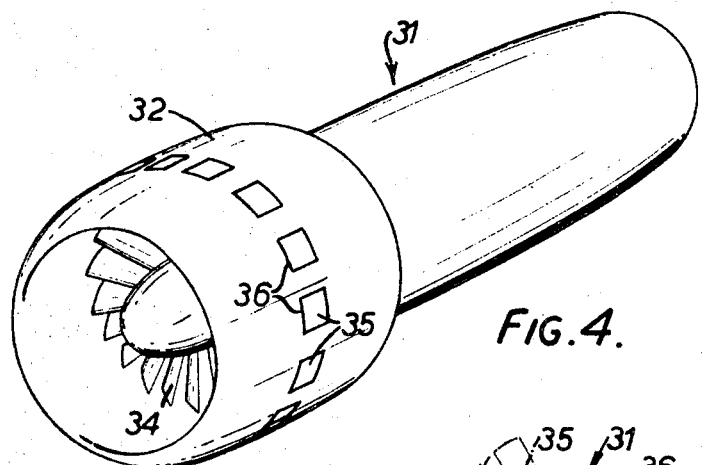
Figure 5:
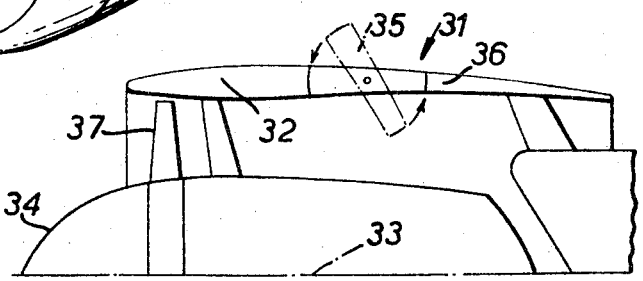
Figure 6:
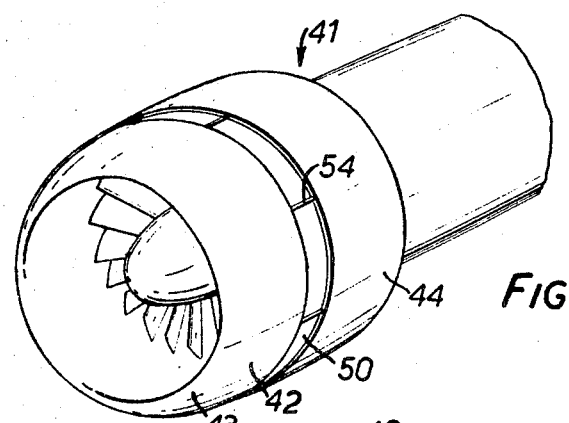
Figure 7:
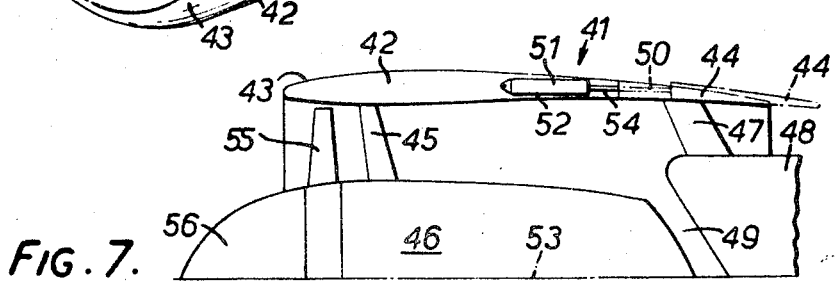
Figure 8:
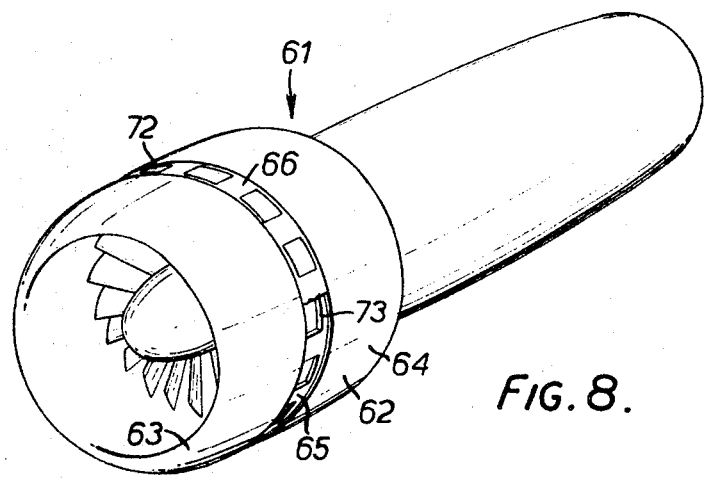
Figure 9:
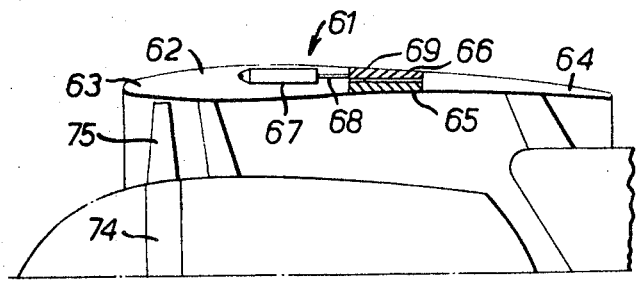
Figure 10:
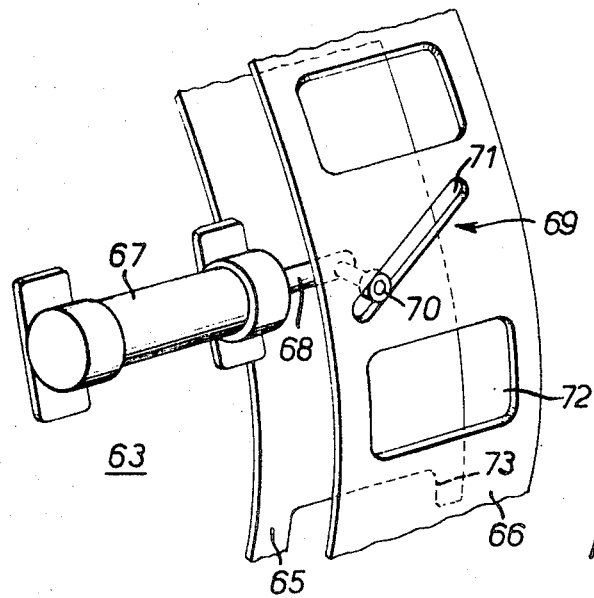

Five embodiments of the invention will now be particularly described by way of example with reference to the accompanying diagrammatic drawings, of which, FIG. 1 is a perspective view of an aircraft gas turbine engine of the ducted-fan by-pass type in accordance with the first embodiment of the invention, FIG. 2 is a partial cross-sectional side elevation of a part of the gas turbine engine shown in FIG. 1, FIG. 3 is a cross-section taken along the line III—III on FIG. 2, FIG. 4 is a perspective view of a gas turbine engine of the ducted-fan by-pass type in accordance with the second embodiment of the invention, FIG. 5 is a partial cross-sectional side elevation of a part of the engine shown in FIG. 4, FIG. 6 is a perspective view of a gas turbine engine of the ducted-fan by-pass type in accordance with the third embodiment of the invention, FIG. 7 is a partial cross-sectional side elevation of a part of the engine shown in FIG. 6, FIG. 8 is a perspective view of a gas turbine engine of the ducted-fan by-pass type in accordance with the fourth embodiment of the invention, FIG. 9 is a partial cross-sectional side elevation of a part of the engine shown in FIG. 8, FIG. 10 is an enlarged cut-away perspective view of a part of the construction shown in FIGS. 8 and 9.

Figure 11:
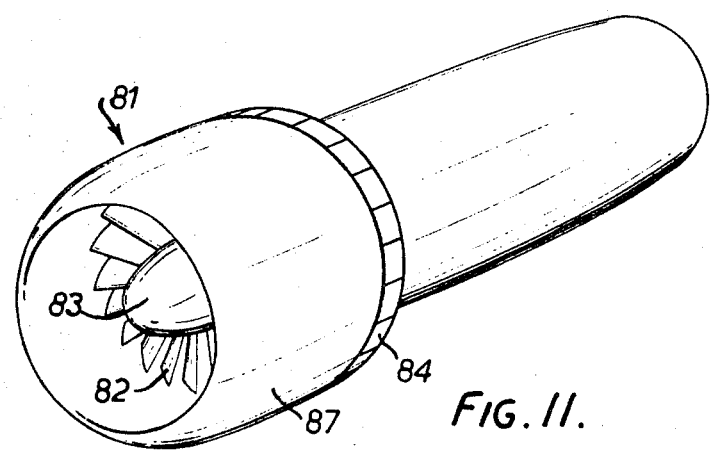
Figure 12:
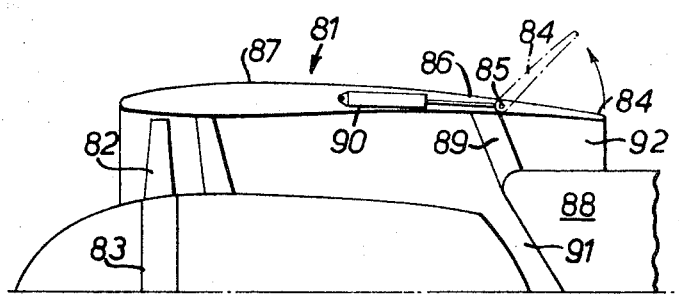

FIG. 11 is a perspective view of a gas turbine engine of the ducted-fan by-pass type in accordance with the fifth embodiment of the invention, and, FIG. 12 is a partial cross-sectional side elevation of a part of the engine shown in FIG. 11.

With reference to FIGS. 1 to 3 of the drawings, an aircraft gas turbine engine 11 of the ducted-fan by-pass type includes a main gas turbine engine assembly 12, which in conventional manner comprises a compressor, a combustion section, a turbine section, and an exhaust section.

The ducted fan assembly 13 of the engine comprises a non-rotative portion 14 including a by-pass duct 15 and a rotative sub-assembly which includes a hub structure 16 and a single-stage fan 17 having flow-varying blading capable of movement into negative pitch. The fan is mounted ahead of the engine compressor and is rotative within the duct 15 by shafting (not shown) taken from the compressor.

When the fan is in positive pitch it charges both the engine compressor and the by-pass duct, and when the fan is in negative pitch the air flow is reversed along the duct, the fan thus producing reverse thrust for aircraft braking and yet air is available for ingestion by the compressor.

The duct 15 is forwardly supported upon the portion 14 by the vanes 18 and is supported rearwardly upon the engine structure by the vanes 19.

The pitch of the blades is infinitely variable in the positive and negative pitch ranges by a servo system (not shown) housed at least in part within the hub 16. The servo system includes a multiple vane-type actuator and follow-up mechanism such as that described in the specification of application Ser. No. 26216.

Hitherto, it has sometimes been found with such constructions of gas turbine engines of the ducted-fan by-pass type that when, for braking of the associated aircraft, the blades of the fan are in negative pitch, the air which is drawn into the by-pass duct, through the annular rear entry, such as at 20 in FIG. 2, formed between the rearward end portion of the duct and the engine assembly, suffers some degree of turbulence due to the suction by the compressor which of course still requires air for the continued operation of the engine and due to the fact that this air, now passing forwardly along the duct, must turn through 180° in order to enter the compressor intake 21. In consequence of such turbulence occurring as the air passes forwardly along the duct 15, an aerodynamic restricting or nozzle effect is produced in the air, well before it reaches the fan blades. Since the entry to the fan is so restricted, the thrust produced by the fan is less than it would be if this aerodynamic restriction was not present.

In order to avoid this aerodynamic restricting effect, and thus to improve the reverse thrust characteristics of a gas turbine engine of the ducted-fan by-pass type, in this first embodiment of the present invention, flap valve means are provided in the wall of the duct 15. These means comprise a plurality of flaps 22 each pivotally mounted in association with respective ports in the duct wall with their pivot axes 23 parallel to the rotational axis 24 of the fan 17. The ports are in alignment peripherally of the duct. Each flap is urged by a respective torsion spring 25 to a closed position in which it overlaps its adjacent flap, all the overlapping flaps effecting complete circumferential closure of the ports. When the ports are open they together form an auxiliary intake 26 for the duct.

During operation of the engine 11, when the pitch of the fan blades is adjusted into negative pitch for braking of the associated aircraft, initially air enters the annular rear entry 20 and there is a tendency for the above-mentioned nozzle effect to be created along the duct 15. This, accompanied by the suction by the compressor, creates such a pressure in the zone of the flaps 22 as to cause them to open against their springs 25. The flaps are maintained open by the flow of ingoing air past them, their shape and pivotal mounting being such as to ensure this. The flaps are shown open in full lines in FIG. 1 and in dotted detail in FIGS. 2 and 3.

Hence, air is now drawn into the duct 15 both through the annular rear entry 20 and the annular auxiliary intake 26, this increased amount of air avoiding the nozzle effect along the duct so that adequate air for ingestion by the compressor is available and so that the air passing forwardly along the duct to the fan is less restricted than hitherto, whereby improved thrust is produced by the ducted fan for aircraft braking.

When the fan blades are returned to the positive pitch range, the air flow along the duct passes rearwardly to the compressor intake 21 and also out through the rearward end portion of the duct 15, the flaps 22 then being closed automatically by their springs 25, and being held closed by the pressure within the duct.

With reference now to the second embodiment of the invention as shown in FIGS. 4 and 5, the construction of gas turbine engine 31 of the ducted-fan by-pass type is similar to that shown in FIGS. 1 to 3, except that instead of providing flaps in the duct 32 with their axes parallel to the rotational axis 33 of the fan 34, flaps 35 are provided, each in association with respective ports 36 in the wall of the duct 32, whose axes are disposed transversely with respect to the axis 33. The ports 36 are of similar size and of rectangular shape, being peripherally equi-spaced around the duct. Respective spring means (not shown) bias the flaps 35 to their closed positions, and when the blades 37 of the fan 34 are adjusted into negative pitch, the suction in the zone of the flaps within the duct 32 causes the flaps to open, moving in the clockwise direction as viewed in FIG. 5, so that the ports 36 together from the auxiliary intake for the duct 32. Again the flaps are maintained open by the flow of ingoing air past them.

With reference to the third embodiment of the invention as shown in FIGS. 6 and 7, the construction of gas turbine engine 41 of the ducted-fan by-pass type is similar to those of the previous two embodiments except that instead of providing flaps on the by-pass duct, the by-pass duct 42 comprises a main forward portion 43 and an aft portion 44. The forward portion 43 is supported by fixed vanes 45 which extend from fixed structure 46, while the aft portion 44 is supported by fixed vanes 47 extending from the engine assembly 48 just behind the compressor intake 49. The aft portion 44 is so mounted on the fixed vanes 47 as to have the ability to slide axially rearwardly with respect to the main forward portion 43 to provide an annular auxiliary intake 50 for the duct 42. The aft portion is displaceable with respect to the main forward portion 43 by a plurality of linear fluid-pressure-operable jacks 51 whose cylinders 52 are mounted fast within the main forward portion 43, and parallel to the rotational axis 53, their piston rods 54 being connected to the aft portion.

When the blades 55 of the ducted fan 56 are adjusted into negative pitch, the jacks 51 are simultaneously extended under fluid pressure to produce the annular auxiliary intake 50, whereby the amount of air which can enter and pass forwardly along the duct is increased. Thus, the above-mentioned nozzle effect is reduced and the said improved thrust by the fan for braking of the associated aircraft is obtained.

When the fan blades are moved back into the positive pitch range, the jacks are simultaneously contracted to close the annular auxiliary intake 50.

With reference to the fourth embodiment of the invention as shown in FIGS. 8, 9 and 10, the construction of the gas turbine engine 61 of the ducted-fan by-pass type is basically similar to those of the previous three embodiments, except that instead of having flaps in the by-pass duct or arranging for the aft portion of the by-pass duct to be axially slidable away from the forward portion of the duct, the by-pass duct 62 is formed by a forward portion 63 and an aft portion 64 with a stationary ported inner ring 65 secured coaxially between them. Coaxially surrounding the ported inner ring 65 is a ported outer ring 66 which is rotatable with respect to the inner ring. Linear fluid-pressure-operable jacks 67 are mounted within the wall of the forward portion 63 of the duct 62 with their piston rods 68 operating helical drive means in the form of respective roller and helical slot devices as at 69, each roller 70 of which is carried by the respective piston rod and the slots 71 of which are provided in the outer ring 66. Linear movement of the piston rods 68 in unison results in rotational adjustment of the outer ring 66 with respect to the inner ring 65. When the jacks 67 are contracted, the outer ring is positioned such that the ports 72 thereof are closed with respect to the ports 73 of the inner ring. When the jacks 67 are fully extended, the ports 72 of the outer ring are fully registering with the ports 73 of the inner ring so that a plurality of equally-peripherally spaced openings are provided through the wall of the by-pass duct 62 forming an auxiliary intake for the duct.

When the blades 75 of the ducted fan 74 are adjusted to negative pitch, the jacks 67 are simultaneously extended under fluid pressure to rotate the outer ring 66 and thus open the auxiliary intake for the duct, whereby again the amount of air which can enter and pass forwardly along the duct is increased. Thus the previously-mentioned nozzle effect is reduced and the said improved thrust by the fan for braking of the associated aircraft is obtained.

When the fan blades are moved back into the positive pitch range the jacks are simultaneously contracted to close the auxiliary intake.

With reference now to the fifth embodiment of the invention as shown in FIGS. 11 and 12, the construction of the gas turbine engine 81 is basically similar to those of the previous embodiments except that the means which is operative when the blading 82 of the fan 83 is in negative pitch to improve the manner in which air enters and flows forwardly along the duct comprises a series of peripherally arranged gill-like members 84 which are hingedly mounted as at 85 on the circular rearward end portion 86 of the by-pass duct 87. The rearward end portion 86 of the duct is supported from the main engine assembly 88 by fixed vanes 89 and thus the members 84 are positioned rearwardly of these vanes.

The members 84 are movable from a first position as shown in full lines in FIG. 12, to a second position as shown in dotted lines. Such movement is effected by a pneumatic jack 90 mounted within the wall structure of the by-pass duct. This jack is of piston-and-cylinder type and, through a rack and pinion mechanism (not shown), drives all the gill-like members in unison by means of flexible shafting (also not shown) peripherally arranged around the wall structure of the duct.

When the engine 81 is operating with the blading 82 of the fan 83 in positive pitch, the gill-like members are maintained in their first positions, air impelled rearwardly by the fan 83 along the duct 87 passing both into the compressor intake 91 and out through the annular exit 92 formed between the members 84 and the main engine assembly 88.

When, for braking of the associated aircraft, the blading 82 is moved into negative pitch, the jack 90 is simultaneously operated to move the members 84 to their second positions as shown in dotted detail in FIG. 12. Thus, these members collectively provide a flared entry for the air now being drawn by the fan into the duct 87 from the rear. This flared entry provides improved in-flow conditions for this air whereby the amount of air which can enter and pass forwardly along the duct is increased and a good flow pattern is provided particularly in the vicinity of the compressor intake 91. Thus adequate air is available for ingestion by the engine compressor and, also, air flow along the duct towards the fan is such as both to avoid the previously-mentioned disadvantageous nozzle effect and to produce improved thrust by the fan for the aerodynamic braking function.

When the fan blades are moved by the associated servo system (not shown), back into the positive pitch range, the jack 90 is operated to move the gill-like members 84 back to their first positions to re-establish the desired area of the annular exit 92. It will be understood that the jack 90 is capable of varying the precise setting of the gill-like members 84 just on either side of their first positions to give desired variation in the exit area when the fan is in positive pitch. Such variation in exit area may be effected in correlation with pitch-changing of the fan blading in the positive range to achieve optimum matching of engine and fan operation.

The invention is in no way limited to the constructional details of the embodiments above described with reference to the drawings, as in other embodiments other suitable means may be provided for increasing the amount of air which can enter and flow forwardly along the by-pass duct when the fan blading is in negative pitch. For example, in other embodiments as an alternative to the embodiment shown in FIGS. 10 and 11, instead of employing gill-like members, the flared rearward entry may be produced by an inflatable annular lip member attached to the rearward end portion of the by-pass duct. The flared entry is then provided when the fan blading is adjusted to negative pitch by introducing air to the interior of the annular lip member whereby this member is inflated to a desired extent.

The invention is in no way limited to the supporting of the rearward portion of the fan from the main engine assembly by stator vanes as shown in the above embodiments described with reference to the drawings, as in other embodiments such vanes may be carried by an intermediary member, itself mounted forward of the main engine assembly and which is also utilized to support the by-pass fan itself in suitable bearings. In this case this intermediary member is of course so connected with the fixed structure of the main engine assembly as to be non-rotative.

The invention is not limited to the manner of pivoting the flaps as disclosed in the first and second embodiments, as in other embodiments where flaps are again provided, their pivots may be at other portions thereon.

Again, although in the third and fourth embodiments hereinbefore described, the cylinders of the jacks are mounted in the forward portions of the by-pass ducts, in alternative embodiments of the invention such cylinders are mounted in the rearward portions of the ducts.

Further, although in the fifth embodiment the gill-like members are operated in unison by a pneumatic jack through a rack-and-pinion mechanism and flexible shafting, in other embodiments such gill-like members are instead operated by peripherally-arranged jacks mounted in the wall structure of the by-pass duct, transmission means between the jacks and the gill-like members converting the linear movement of the jacks into hinging movement of the gill-like members.

I claim:

1. A fan assembly for a gas turbine engine of the ducted-fan by-pass type including a non-rotative by-pass duct and a single-stage fan mounted for rotation by the engine within the by-pass duct, said fan having flow-varying blading capable of movement from positive pitch into negative pitch whereby the direction of flow of air in the duct is reversed, and said duct having means located downstream with respect to the fan blading when in positive pitch and operative when the fan blading is in negative pitch to increase the amount of air introduced to the duct.

2. A fan assembly as claimed in claim 1, wherein said means comprises flap valves pivotally mounted in the wall of the duct and openable automatically, when the fan blading is adjusted to negative pitch, by consequent suction created in the duct.

3. A fan assembly as claimed in claim 2, wherein ports are provided in the wall of the duct with which the flap valves are co-operable, said ports being arranged in alignment peripherally of the duct.

4. A fan assembly as claimed in claim 3, wherein the axes about which the flap valves are pivotable are parallel to the rotational axis of the fan.

5. A fan assembly as claimed in claim 3, wherein the axes about which the flap valves are pivotable are arranged transversely with respect to the rotational axis of the fan.

6. A fan assembly as claimed in claim 1, wherein said means comprises a rearward portion of the duct which is axially displaceable rearwardly with respect to a main portion thereof by operating means to produce an annular auxiliary intake in the wall of the duct.

7. A fan assembly as claimed in claim 6, wherein said operating means comprises fluid-pressure-operable jacks carried within the structure of the main portion of the duct, with their axes parallel to the rotational axis of the fan, and directly connected between said main portion and said rearward portion of the duct.

8. A fan assembly as claimed in claim 1, wherein said means comprises two intermediary annular portions of the duct which are ported and which are relatively rotatable about the rotational axis of the fan by operating means, the ports when in registry, those of one of said portions with respect to those of the other of said portions, producing a series of peripherally spaced intake openings through the wall of the duct.

9. A fan assembly as claimed in claim 8, wherein said operating means comprises fluid-pressure-operable jacks carried within the structure of the duct, with their axes parallel to the rotational axis of the fan.

10. A fan assembly as claimed in claim 9, wherein said jacks are connected between said structure and helical drive means in one of said two intermediary annular portions, said helical drive means converting linear movement of the jacks into rotary movement of said one portion with respect to the other portion.

11. A fan assembly as claimed in claim 1, wherein said means comprises a series of peripherally arranged gill-like members pivotally mounted upon the rearward end portion of said duct and capable, as or when the fan blading is moved into negative pitch, of being moved outwardly about their pivots so as collectively to provide a flared entry for the rearward end portion of the duct.

12. A fan assembly as claimed in claim 11, wherein said gill-like members are operated by fluid-pressure-operable jacks housed within the duct structure.

13. A fan assembly, for attachment to the front of a main gas turbine engine assembly to provide an engine of the ducted-fan by-pass type, and constructed as a unitary assembly which can be fitted and removed as such and comprises a non-rotative portion, which includes a by-pass duct, and a rotative sub-assembly comprising a single-stage fan supported in bearings by the non-rotative portion, said fan having flow-varying blading surrounded by said by-pass duct and capable of movement from positive pitch into negative pitch whereby the direction of flow of air in the duct is reversed, and said duct having means located downstream with respect to the fan blading when in positive pitch and operative when the fan blading is in negative pitch to increase the amount of air introduced to the duct.

14. A gas turbine engine of the ducted-fan by-pass type having a front-mounted fan assembly which includes a single-stage fan and a non-rotative duct within which the fan is rotatable, said fan having flow-varying blading capable of movement from positive pitch into negative pitch whereby the direction of flow of air in the duct is reversed, and said duct having means located downstream with respect to the fan blading when in positive pitch and operative when the fan blading is in negative pitch to increase the amount of air introduced to the duct.

15. A gas turbine engine of the ducted-fan by-pass type having a front-mounted fan assembly which is detachable from the remainder of the engine as a complete assembly and which comprises a rotative sub-assembly, in the form of a single-stage fan including a hub and flow-varying blading, and a non-rotative portion by which the complete assembly is mounted and which includes a stationary duct which surrounds said flow-varying blading, said flow-varying blading being capable of movement from positive pitch into negative pitch whereby the direction of flow of air in the duct is reversed, and said duct having means located downstream with respect to the fan blading when in positive pitch and operative when the fan blading is in negative pitch to increase the amount of air introduced to the duct.

* * * * *